INVENTOR.
ROLF K. MUELLER
BY Harold D. Jastram
ATTORNEY

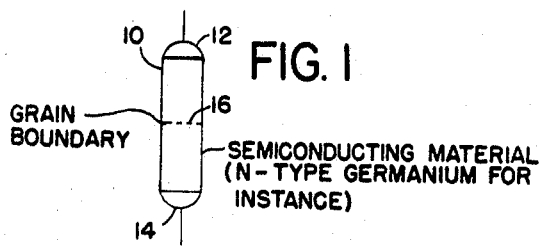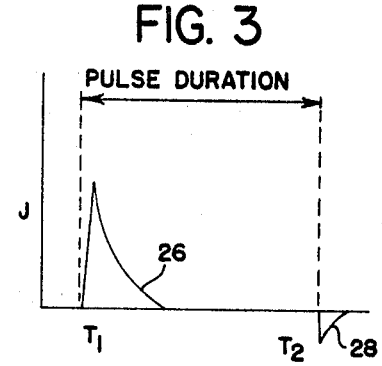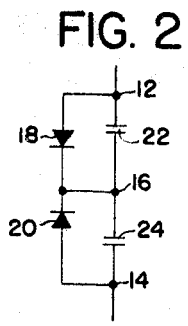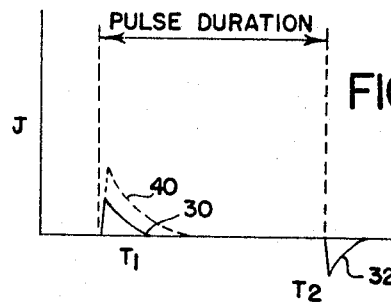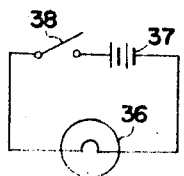

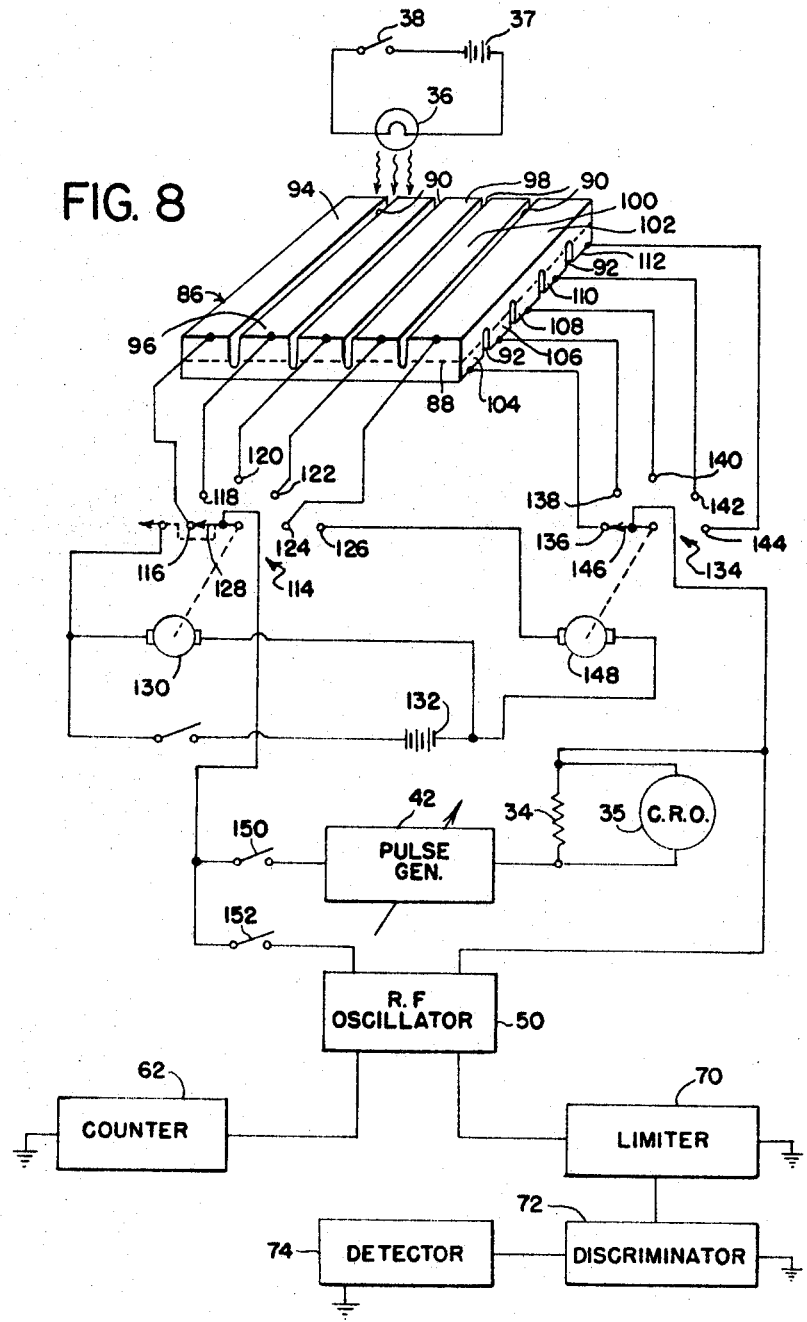

United States Patent Office 3,449,579
Patented June 10, 1969

3,449,579
PHOTOMETER AND METHOD UTILIZING A SEMICONDUCTOR CONTAINING A GRAIN BOUNDARY
Rolf K. Mueller, St. Paul, Minn., assignor, by mesne assignments, to Litton Systems Inc., Beverly Hills, Calif., a corporation of Maryland
Continuation of abandoned application Ser. No. 778,678, Dec. 8, 1958. This application Feb. 21, 1963, Ser. No. 260,103
Int. Cl. A01j *39/12;* G01j *1/42*
U.S. Cl. 250—211  10 Claims This application is a continuation of applicant's application Ser. No. 778,678, filed Dec. 8, 1958, now abandoned.

This invention relates generally to light sensing devices, and pertains more particulary to a photometer and method utilizing a grain boundary in a semiconductor for obtaining an indication of the amount of light striking in the vicinity of the grain boundary.

One important object of the invention is to provide a photometer possessing a high degree of accuracy and sensitivity.

Also, an aim of the invention is to provide a photometer exhibiting a very low noise level when operated in a selected manner.

Another object is to provide a photoresponsive device having good amplification characteristics that are inherent in the device. More specifically, it is an aim to provide a photometer having a built-in amplification resulting in an increase in the "effective quantum yield."

Another object of the invention is to provide a photometer which utilizes a semiconducting material, which is integrating in its operation, and in which the integration time can be varied readily.

A still further object of the present invention is to provide a new and improved method and apparatus for measuring the quantity of light which strikes a surface during a predetermined period of time.

A further object is to provide a photometer of the foregoing type in which the response time may be electronically adapted to the time variation of the signal being observed.

A still further object of the invention is to provide a light determining means in which no modulation of the received radiation is necessary.

Yet another object is to provide a photosensitive device that lends itself to production in strip or mosaic form.

A still additional object is to provide a photosensitive device the fabrication or realization of which avoids the use of complex doping procedures.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIGURE 1 is a greatly enlarged view of a semiconductor element or cell containing a grain boundary intermediate its ends;

FIG. 2 is a schematic diagram representing the equivalent circuit of the cell depicted in FIGURE 1;

FIG. 3 is a curve illustrating the resulting current response when the cell of FIG. 1 is subjected to a charging pulse, the cell having been in what may be considered to be an initially uncharged state;

FIG. 4 depicts a pair of curves, the solid line curve illustrating the current response that occurs when the cell is already charged but subjected to an additional charging pulse, and the dotted line curve representing the current response that occurs when the cell has become partially discharged owing to the impingement of light thereupon;

FIG. 5 is a schematic diagram illustrating one way in which a semiconductive element containing a grain boundary can be utilized as a photometer;

FIG. 8 shows a photometer embodying a matrix of semiconductive cells.

Figure 6:
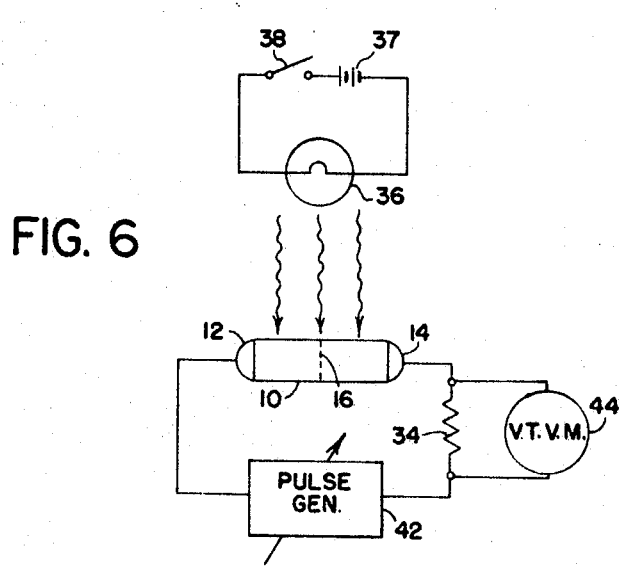
FIG. 6 is a schematic diagram basically similar to that of FIG. 5, but depicting a different instrument for providing an indication of the amount of light impinging against the grain boundary of the semiconductor cell.

Discussing the diagrams individually and in detail, FIG. 1 shows a typical grain boundary cell 10. The cell consists of a block of semiconducting material with contacts 12, 14 soldered to the ends and a grain boundary 16 somewhere between the two ends. On either side of the boundary the semiconducting material is single crystalline, i.e., the crystal lattice is continuous. However, the two crystals are tilted with regard to one another, with the result that at the junction there is a discontinuity in the crystal lattice. The discontinuity can be understood as a series of edge twpe dislocations. Each dislocation has dangling bonds which act as either holes or electron traps depending upon the type of semiconducting material in question. In N-type germanium, for example, the dangling bond consists of an unpaired electron which traps free electrons, giving the boundary a net negative charge. The net negative boundary charge repels the conduction electrons in the bulk material, leaving an electron depleted region with a low conductivity adjacent to the boundary.

Consequently, the boundary constitutes a potential barrier to the flow of electrons and the equivalent electrical circuit consists of a series-parallel combination of two diodes 18, 20 and two condensers 22, 24 as shown in FIG. 2. The values of the two capacities are dependent upon the width of the electron depleted region, which is in turn dependent upon the net charge on the boundary.

Under equilibrium conditions the height of the potential barrier in N-type germanium is of the order of a few tenths of an electron volt. If one now applies a bias of either polarity between the ends of the sample, the potential barrier is lowered and an electron flow into the boundary takes place. The magnitude of this flow, and consequently the charging time, is limited only by the bulk resistance of the germanium and not by diffusion processes and minority carrier storage effects as in the case in conventional diodes.

A pictorial representation of the current flow into the boundary which results when a square voltage pulse is applied to the sample is shown in FIGS. 3 and 4. FIG. 3 shows a current pulse 26 which results when the voltage is applied to an uncharged boundary. There is at first a rapid (limited only by the generator rise time) rise to a maximum, followed by a slower decay (of the order of $10^{-7}$ sec.) as the boundary potential approaches that of the applied pulse. The small negative pulse, labelled 28, which appears after cessation of the applied voltage pulse is due to a redistribution of the carriers in the bulk material and is not important for the purposes of this discussion.

If, after having charged the boundary as shown in FIG. 3, one now applies a second voltage pulse of the same magnitude to the sample, one obtains the current pulse, denoted by the numeral 30, shown in FIG. 4. In this case the current is much smaller, since the boundary has retained the charge provided by the previous pulse and consequently presents a large barrier to further current flow.

This pulse actually represents the capacitive response of the boundary. Once again, though, a small negative pulse 32 appears after cessation of the applied voltage pulse, this pulse corresponding in magnitude to the pulse 28 and also to the pulse 30.

From the foregoing it can be seen that grain boundaries in N-type germanium carry a negative surface charge. Of course, others do too, for example, silicon. Such a negative surface charge presents a potential barrier for electrons. While there is a steady state equilibrium height that the cell will naturally assume if given sufficient time, the height of the equilibrium potential barrier can be increased by the application of a voltage pulse across the boundary. In other words, if it is assumed that the equilibrium state is the initial state, though actually negatively charged, the application of the pulse 26 raises the height by hole injection. Thus the barrier height is a relaclearer as the description progresses, the height of the barrier may be decreased or lowered from the equilibrium height by hole injection. Thus the barrier height is a relative condition that can be modified, either up or down, with respect to the equilibrium height, which has also been referred to as representing the uncharged state of the cell 10.

Before going further it should be explained that the foregoing discussion has been limited for the most part to N-type germanium where the majority carriers are electrons and the boundary contains a net negative charge, since most of the present experience has been with this type of material. However, there are a number of other materials which would be suitable and which would have some advantages (and of course some disadvantages) over germanium. For instance, usable grain boundaries have been reported in N-type silicon and in P-type indium antimonide, and there is reason to believe that boundaries in other III–V compounds and in silicon carbide might have useful characteristics. The discussion of the operation of the device would be the same as the foregoing for all N-type materials, while for P-type materials, where holes are the majority carriers, one would merely substitute holes for electrons in the discussion and postulate a boundary with a net positive charge.

As we stated previously, each type of material would have its own advantages. As an example, silicon could be used at room temperature (20° C.), while germanium must be cooled to liquid nitrogen temperature (−196° C.). The reason for this is that it takes a larger amount of energy to produce a free conduction electron in silicon and therefore there are not many carriers with enough thermal energy at 20° C. to disturb the charge on the boundary. In germanium, for instance, the boundary would discharge to its equilibrium value almost instantaneously at 20° C., while at −196° C. the charge changes by about 1% in three hours. Indium antimonide, on the other hand, having a smaller energy gap between the valence and conduction bands than germanium, would have to be cooled to still lower temperatures. Thus, the relaxation time, i.e., in this particular situation, the discharge-time after a pulse has been applied, with which a perturbed barrier relaxes to its equilibrium height increases very rapidly with decreasing temperature. Therefore, a temperature range exists in which the relaxation time of the grain boundary barrier is large compared to the time necessary to effect changes in the barrier height. In other words the grain boundary barrier provides a memory function for the semiconductor or device in which the semiconductor is used.

It is an interesting characteristic of grain boundaries in the above temperature range that the application of a voltage pulse of a given height across the boundary increases the barrier height to a value which is practically independent of the barrier height prior to pulse application. This characteristic makes it possible to establish a reference state of charge for the boundary in a time interval of the order of microseconds which persists constituting a memory function for many hours if hole injection is avoided. Although the resulting elevated barrier height itself is independent of the barrier height existing before the pulse is applied, nevertheless there is a transient response to the pulse that is dependent markedly on the state of the boundary prior to the pulse, thereby providing a signal indicative of the boundary condition, i.e., its height, prior to the pulse. By using this phenomenon as applied to a grain boundary in a temperature range where the relaxation time is large compared to the time involved in changing the barrier height, it is possible to produce a light-sensing device. Stated somewhat differently, subjection or exposure of the grain boundary to the light, the intensity of which is to be determined, affects the transient response. By examining this transient response in various manners hereinafter more fully explained, the light intensity itself can be ascertained.

With the preceding information in mind, it is believed that the circuitry of FIG. 5 will now be understood. This circuitry includes the semiconductor cell 10 containing the grain boundary 16. Connected in series with the cell 10 is a square pulse generator 33 and a load resistance 34, the load resistance 34 having a cathode ray oscilloscope 35 connected thereacross. If the cell 10 is in its equilibrium state of charge (what I have chosen to call a discharged state) when a pulse is transmitted from the generator 33, the transient pulse 26 of FIG. 3 can be observed on the oscilloscope 35. If a second pulse is supplied, the smaller transient pulse 30 of FIG. 4 will be seen, for the cell 10 will have had its potential barrier raised by the action of the first pulse. For the sake of initial illustration it has been assumed that the interval between pulses has been short in respect to the natural relaxation time and that no intervening action has occurred which would have lowered the elevated potential barrier.

However, the height of the potential barrier can be reduced by hole injection, and in this case light energy does this. Solely for the sake of illustration, a light source 36 is shown, being energized from a battery 37 when the switch 38 is closed. Consequently, with the elevated potential barrier serving as a reference charge state, impingement of light onto the grain boundary 16 from the source 36 will have the effect of lowering the potential barrier. If after the barrier has been lowered by light impingement, the pulse generator 33 applies a second pulse to the cell 10, a pulse 40 will be produced which has been superimposed on FIG. 4 in dotted outline. It can be readily discerned that this pulse is larger than the pulse 30. The difference in magnitude between the pulses 30 and 40, which is the area lying between the pulse envelopes, is representative of the number of photons that have struck the grain boundary 16 during a given interval. In other words, the semiconductor cell 10 has been partially discharged due to the action of the light and the recharging is observable on the oscilloscope 35.

In a more practical embodiment of the invention, one would prefer to have the pulse generator 33 supply a series or chain of square pulses during the period of light impingement. The pulse repetition rate would be variable and the rate that would best suit the light conditions would be selected. Stated somewhat differently, for given pulse magnitudes the pulse repetition rate would be generally increased in accordance with increased light intensity to the extent that the impinging light will cause only a partial discharge after the application of a particular pulse of the chain. In the circuitry depicted in FIG. 6 the chain of pulses both sensitize the cell 10 and in the same operation provide a read-out of the amount of light received between pulses. The only difference between the instant circuit and that of FIG. 5 is the substitution of a variable rate pulse generator 42 for the previously used generator 33 and a vacuum tube voltmeter 44 for the cathode ray oscilloscope 35. What the voltmeter 44 measures is the peak value of a series of pulses corresponding to a plurality of the pulses 40. It will be understood, though, that the meter could also be of either the integrating or R.M.S. variety, as it is only necessary to sense some aspect of the pulse envelope that is indicative of the potential barrier height. For a given pulse rate, if the voltmeter 44 reads a fairly large value, it means that a considerable amount of light is striking the cell 10, whereas if the meter reads a smaller value, it signifies that a lesser number of photons are involved. In this sense it is a quantity measuring device measuring, as noted, the number of photons striking the cell 10. It will, of course, be realized that if no light strikes the cell 10, then the height of the potential barrier remains at an elevated value with the consequence that a resulting pulse of the order of the pulse 30 of FIG. 4 will result. On the other hand, if a large number of photons strike the grain boundary the potential barrier will be appreciably lowered, although care should be taken to utilize a pulse repetition rate that is rapid enough to prevent saturation of the cell between pulses. What occurs then is that the cell 10 is being successively recharged via the application of a number of pulses and is constantly being partially discharged by the light impinging on the grain boundary 16. It is the amount of recharging that is being measured by the meter 44 and since this amount of recharging is influenced by the amount of light that has effected the discharge, it follows that a reliable indication is obtained as to the intensity of the light striking the cell 10. In other words, it is the degree of deviation from a reference charge state caused by the impingement of light on the grain boundary 16 that is being determined.

From what has been said it should be plain that the surface charge at the grain boundary 16 determines the height of the potential barrier developing in the region adjacent to the grain boundary. It is also true that the capacitance is related to the negative surface charge at the boundary. Inasmuch as both the potential barrier height and the capacitance are related to the surface charge, it follows that the capacitance is related to the barrier height. If C represents the capacitance and $\phi$ the barrier height, then the following relation can be shown to exist:

$$C\phi^{-\frac{1}{2}}$$

If the negative surface charge is reduced by hole injection, the potential barrier is reduced and therefore the capacitance increases. Consequently, when light is permitted to strike the cell 10 in the vicinity of the grain boundary 16, the capacitance will increase over its previous value. Thus if the fully charged condition of the cell 10 represents the reference charge state, the capacitance corresponding to this state will be comparatively low. However, if after light has had a chance to strike the cell 10, then the capacitance will be increased. Actually, when measuring capacitive changes, it is not necessary to start with the cell 10 at an elevated barrier height. Instead, the equilibrium barrier height may be utilized, one value of capacitance prevailing for this reference charge state. Impinging light, because of its hole injection effect, will cause an increase in the capacitance above that existing for the equilibrium state. It is interesting to note that with the assumption of unity quantum yield, the radiative energy necessary to change cell's 10 capacity 0.1%, a change that is easily detected with known instrumentation, $1.9 \times 10^6$ photons would be necessary for typical cell dimensions. Assuming photons of 0.7 ev. energy, a total radiative energy of only $2 \times 10^{-13}$ watt-second is required, thereby demonstrating that a rather sensitive photodetector is possible with this arrangement.

Figure 7:
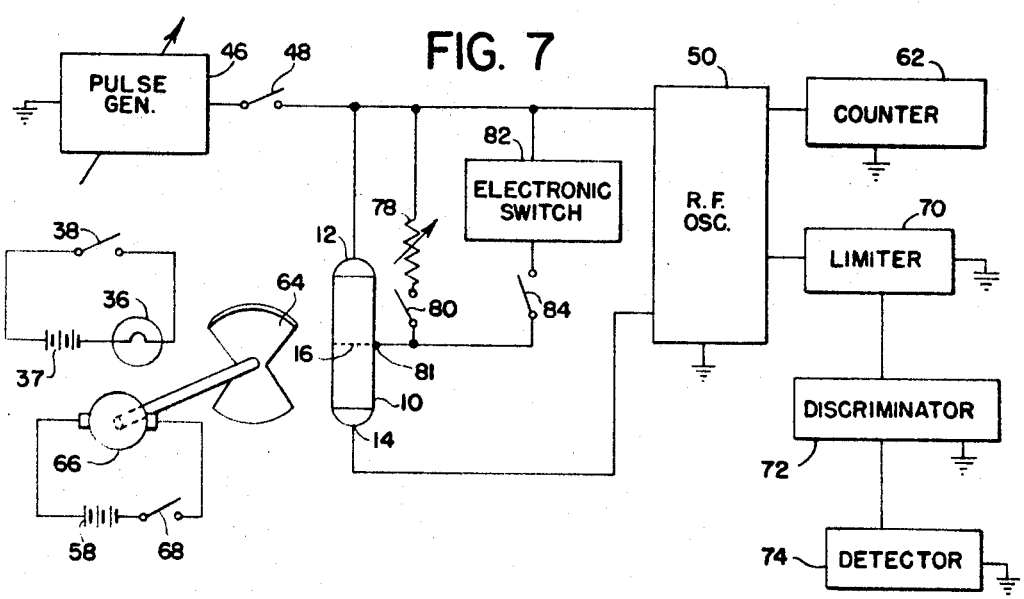
FIG. 7 is a schematic diagram, largely in block form, presenting a circuit by which capacitive changes due to light striking the semiconductor cell may be determined.

As an aid to a complete understanding as to how the preceding capacitance arrangement might be put to practical use, attention is now directed to FIG. 7. Here a pulse generator 46 corresponding to the generator 42 of FIG. 6 is employed, which may be completely removed from the ensuing circuitry by opening a disconnect switch 48. The cell 10 is part of the tank circuit of a radio frequency oscillator 50. Because the cell 10 is here made a part of the tank circuit, its grain boundary capacity is used as the frequency determining element of the oscillator 50 whose output may be monitored in one of two ways: If the incident radiation from the light coming from the source 36 is unchopped, one may note the change in frequency on a counter 62. On the other hand, if the light is chopped, as by a chopper 64 driven by a motor 66 connectible to a battery 58 via a switch 68, one can detect the modulating signal with an F-M limiter 70, a discriminator 72, and any conventional A-C detector 74. The only special requirement associated with the circuitry of FIG. 7 is that the oscillator 50 be stable with a feedback voltage of less than about ten millivolts. This requirement is necessitated by the fact that under no-bias conditions the equilibrium potential barrier at the grain boundary 16 is of the order of a few tenths of a volt and a larger feedback voltage would disturb the charge on the boundary. All that need be done to limit the feedback and maintain the stability of the oscillator 50 is to drive the last stage of the amplifier into grid conduction and into cut-off.

One of the useful features of the grain boundary photodetector portrayed in FIG. 7 is the ease with which the relaxation time can be controlled electronically. At liquid nitrogen temperature ($-196°$ C.) and at low levels of incident radiation, the inherent relaxation time constant is a matter of hours. In other words, after a change has been produced in the height of the potential barrier, for instance causing it to change from its equilibrium height to a still lower height, a considerable length of time is required for it to return to its equilibrium level. This time may be accelerated to any desired degree in an electronic manner by alloying an indium dot 81 to the boundary 16. One then has a direct contact to the boundary 16 and the time constant can be modified by connecting a resistor 78 leading from one ohmic contact 12 at the end of the cell 10 through a switch 80 to said contact 81. A somewhat similar scheme involves the use of an electronic switch 82 which periodically applies a short between the grain boundary 16 and the ohmic contact 12 for very short intervals. A manual switch 84 permits the electronic switch to be disconnected from the circuit.

Although the system set forth in FIG. 7 will normally be operated without the application of pulses to the cell 10, the reference charge state then being either at the equilibrium level or somewhat beneath this level, it is also planned that this system be operated at barriers above the equilibrium state. It is then that the switch 48 would be closed so as to connect the pulse generator 46 into the circuit. From information that has been previously given, it will be appreciated that the system then functions in a lower capacitance range because the higher the barrier, the lower the capacitance ($C\phi^{-\frac{1}{2}}$). Also, in this case one may dispense with the mechanical chopper, since the pulse generator provides the A-C signal which modulates the RF oscillator.

In summation, there are actually three ways in which the system of FIG. 7 may be operated, depending on which of the switches 48, 80 or 84 is closed. Further, depending on whether the chopper 64 is functioning, the manner in which the monitoring or reading of light information may also be modified; as already explained, when the chopper 64 is not operating, the counter 62 may be employed, whereas when the chopper is rotating or the boundary charge is being pulsed, the detector 74 will be employed.

FIG. 8 illustrates the use of a matrix 86 to provide a plurality of cells that function in the same manner as the individual cells 10. In this situation the matrix 86 was originally a small slab of semiconductive material having a grain boundary 88. The individual cells, in this case twenty-five, are formed by cutting a set of parallel grooves 90 on one side and a second set of grooves 92 on the opposite side, the two sets being perpendicular to each other. Close inspection of the figure will reveal that each set of grooves 90, 92 is deep enough to cut through the boundary 88. Photo-resist and etching techniques that have been commonly employed in the making of printed circuits can be used in the fabrication of the matrix 86.

The grooves 90 divide the upper surface of the matrix 86 into individual strips 94, 96, 98, 100 and 102, whereas the grooves 92 divide the lower surface into strips 104, 106, 108, 110 and 112. Each cell, therefore, is formed by the overlapping section of these various strips, the number of cells being twenty-five for the assumed number of strips. Obviously, single strips could be used with any preferred number of cells included therein.

In order to scan the various cells constituting the matrix 86, sequencing circuitry of an electronic nature would normally be employed. For illustration purposes, though, a first rotary switch 114 comprised of five main contacts 116, 118, 120, 122 and 124; an auxiliary contact 126; and a wiper arm 128 are utilized, the wiper arm being driven by a motor 130 energizable from a source of power 132. The contacts 116–124 are connected to the strips 94–102, respectively. A second rotary switch 134 is provided with contacts 136, 138, 140, 142, 144 and a wiper arm 146, this switch being operated by a motor 148. Since the motor 148 is in circuit with the contact 126 of the rotary switch 114, it will be energized only once for each revolution of the arm 128. Via such an arrangement the switch 134 will be operated in a "stepped" relationship with the switch 114 so that a sequential scanning of the twenty-five cells making up the matrix 86 will be achieved.

The photosensing system of FIG. 8 may be operated in any of the previously described ways. This system has a number of uses but will find especial utility for imaging purposes. For instance, a switch 150 permits the pulse generator 42 to be connected into the circuit. Then the system functions in a manner similar to that presented in FIG. 6. If the switch 152 is also closed, the effect is the same as in FIG. 7 with the switch 48 closed, since the generators 42 and 46 may be identical. On the other hand, if only the switch 152 is closed, then the instant system functions in the same way as when switch 48 of FIG. 7 is open but with either switch 80 or 84 closed. For drawing simplification these switches 80, 84 have been omitted from FIG. 8, as has the chopper 64.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A photometer for sensing light, which comprises:
   means for generating first and second selected voltage pulses spaced by a given interval of time, and
   a semiconductive element of a single material type having a grain boundary therein, said grain boundary being responsive to said first voltage pulse for assuming a given reference charge condition, said grain boundary being effective upon cessation of said first selected voltage pulse to retain said reference charge condition for a given relaxation period, said relaxation period exceeding said given interval of time, said grain boundary being effective in response to said first selected voltage pulse to conduct a first current pulse having a first transient characteristic dependent upon the charge condition of said grain boundary prior to application of said first selected voltage pulse, said grain boundary being responsive to said light during said relaxation period for changing said given reference charge condition to a second charge condition,
   said generating means being effective after said response of said grain boundary to said light to apply said second selected voltage pulse across said grain boundary to recharge said grain boundary to said given reference charge condition, said second selected voltage pulse being effective to render said grain boundary effective to conduct a second current pulse having a second transient characteristic distinct from said first transient characteristic for indicating the quantity of said light causing said change in said given reference charge condition.

2. A photometer for indicating the quantity of light sensed, which comprises:
   means for producing first and second selected voltage pluses spaced by a given interval of time;
   a semiconductive element of a single material type having a grain boundary therein, said grain boundary being responsive to said first selected voltage pulse for assuming a given reference charge condition, said grain boundary being effective upon cessation of said first selected voltage pulse to retain said given reference charge condition for a given relaxation period, said relaxation period exceeding said given interval of time, said grain boundary being responsive to said light during said relaxation period for changing said given reference charge condition to a second charge condition;
   said producing means being effective after said response of said grain boundary to said light to apply said second selected voltage pulse across said grain boundary to recharge said grain boundary to said given reference charge condition, said second selected voltage pulse rendering said grain boundary effective to conduct a current pulse having a transient response characteristic indicative of the difference between said given reference charge condition and said second charge condition, and
   means responsive to said conducted current pulse for producing a signal according to said transient response characteristic to indicate the quantity of said light sensed.

3. A photometer for sensing light, which comprises:
   a semiconductive element of a single material type having a grain boundary therein;
   a means for applying a series of first, second and third voltage pulses across said grain boundary, each of said voltage pulses being equal;
   a said grain boundary being effective in response to said first voltage pulse to assume a reference charge condition, said reference charge condition of said grain boundary being changed to second and third charge conditions in response to light sensed during the intervals between said respective first and second and second and third voltage pulses;
   said second voltage pulse being effective to recharge said grain boundary from said second charge condition to said reference charge condition and to render said grain boundary effective to conduct a first current pulse having a first peak value indicative of said second charge condition;
   said third voltage pulse being effective to recharge said grain boundary from said third charge condition to said reference charge condition and to render said grain boundary effective to conduct a second current pulse having a second peak value indicative of said third charge condition; and
   means responsive to said first and second peak values of said respective first and second current pulses for indicating the intensity of said light sensed.

4. A photometer for sensing light, which comprises:
   a voltage pulse generator for producing a succession of spaced voltage pulses;
   a semiconductive element of a single material type having a grain boundary therein, said grain boundary being responsive to each of said spaced voltage pulses for assuming a given reference charge condition, said grain boundary being effective upon cessation of each of said spaced voltage pulses to retain said reference charge condition for a given relaxation period.

a light chopper for applying a light pulse to said grain boundary during each of said relaxation periods;

said grain boundary being responsive to each of said light pulses during each of said relaxation periods for changing said given reference charge condition to another charge condition;

said voltage pulse generator being effective after each of said light pulses to apply the next successive voltage pulse across said grain boundary to recharge said grain boundary to said reference charge condition, each of said next successive voltage pulses being effective to render said grain boundary effective to conduct a current pulse having a transient response characteristic indicative of the difference between said reference charge condition and said other charge condition; and means responsive to each of said conducted current pulses for generating a signal according to each of said transient response characteristics to indicate the intensity of said light sensed by said grain boundary.

5. A photometer in accordance with claim 4 in which said semiconductive element is in the form of a matrix to provide a plurality of photoresponsive cells and which further includes means interconnecting said pulse generator and said cells to successively connect said pulse generator with the individual cells of the matrix of cells.

6. A method of determining light intensity, which comprises:

subjecting a semiconductive element having a grain boundary provided with a reference charge condition to light during a given interval of time to reduce said reference charge condition to a second charge condition, and applying a voltage pulse to said semiconductive element to cause said grain boundary to conduct a current pulse having a transient characteristic indicative of the difference between said said reference charge condition and said second charge condition to determine the intensity of said light.

7. A method of determining light intensity, which comprises:

subjecting a semiconductive element having a grain boundary provided with a reference charge condition to light to reduce said reference charge condition to a second charge condition;

storing said second charge condition by maintaining said semiconductive element at a selected temperature; and determining said stored second charge condition by applying a voltage pulse to said semiconductive element to return said grain boundary to said reference charge condition and to cause said grain boundary to conduct a current pulse having a transient characteristic indicative of the intensity of said light.

8. A method of determining the intensity of light, which comprises:

applying a first voltage pulse to a semiconductive element having a grain boundary therein to charge said grain boundary to a reference charge condition, maintaining said semiconductive element at a selected temperature to provide a selected relaxation time in which said grain boundary discharges from said reference charge condition to an equilibrium condition, directing said light onto said grain boundary for a short period of time relative to said relaxation time to change said reference charge condition of said grain boundary to a second charge condition according to the intensity of said light, and applying a second voltage pulse to said semi-conductive element to render said grain boundary effective to conduct a current pulse having a transient characteristic dependent upon the difference between said second charge condition and said reference charge condition for indicating the intensity of said light.

9. A method of determining the intensity of light, which comprises:

directing successive pulses of light onto a grain boundary provided in a semiconductive element to successively reduce a reference charge condition of said grain boundary to a second charge condition according to the intensity of said light pulses, between said successive pulses of light applying a voltage pulse to said semiconductive element to render said grain boundary effective to conduct a current pulse having a transient response characteristic indicative of the second charge condition of said grain boundary and to recharge said grain boundary to said reference charge condition, and monitoring the transient response characteristic of successive current pulses produced in response to successive ones of said voltage pulses to indicate the intensity of said light pulses.

10. A photo intensity determining method, which comprises:

repeatedly charging a grain boundary of a semiconductor element to a reference charge condition, between said repeated chargings subjecting said grain boundary to light to change said reference charge condition according to the intensity of said light and to condition said grain boundary for conducting a current pulse having a peak amplitude indicative of said change upon occurrence of said next repeated charging of said grain boundary to said reference charge condition, and monitoring each of said current pulses caused by each of said repeated chargings of said grain boundary to indicate the intensity of said light.

No references cited.

RALPH G. NILSON, *Primary Examiner.*

M. A. LEAVITT, *Assistant Examiner.*

U.S. Cl. X.R.

356—218

UNITED STATES PATENT OFFICE
CERTIFICATE OF CORRECTION

Patent No. 3,449,579                               Dated June 10, 1969

Inventor(s) R. K. MUELLER

It is certified that error appears in the above-identified patent and that said Letters Patent are hereby corrected as shown below:

In the specification, Column 3, Line 17, after the word height delete "by hole injection. Thus the barrier height is a rela-" and insert therefor --of the potential barrier, although it will become--.

In the specification, Column 3, Line 75, insert parenthesis in front of con-; and in Column 4, Line 1, insert parenthesis after function.

SIGNED AND
SEALED
APR 14 1970

(SEAL)
Attest:

Edward M. Fletcher, Jr.
Attesting Officer

WILLIAM E. SCHUYLER, JR.
Commissioner of Patents